(12) United States Patent
Komiya

(10) Patent No.: US 10,461,345 B2
(45) Date of Patent: Oct. 29, 2019

(54) FUEL GAS STORAGE AND SUPPLY SYSTEM

(71) Applicant: TOYOTA JIDOSHA KABUSHIKI KAISHA, Toyota-shi, Aichi-ken (JP)

(72) Inventor: Kenji Komiya, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 122 days.

(21) Appl. No.: 15/805,281

(22) Filed: Nov. 7, 2017

(65) Prior Publication Data

US 2018/0138528 A1 May 17, 2018

(30) Foreign Application Priority Data

Nov. 16, 2016 (JP) .................. 2016-223198

(51) Int. Cl.
*H01M 8/04* (2016.01)
*H01M 8/04082* (2016.01)
(Continued)

(52) U.S. Cl.
CPC ......... *H01M 8/04201* (2013.01); *F17C 5/007* (2013.01); *F17C 7/00* (2013.01); *F17C 13/025* (2013.01); *H01M 8/04089* (2013.01); *H01M 8/04373* (2013.01); *H01M 8/04425* (2013.01); *H01M 8/04753* (2013.01); *F17C 2205/0134* (2013.01); *F17C 2205/0142* (2013.01); *F17C 2205/0326* (2013.01); *F17C 2205/0335* (2013.01); *F17C 2205/0341* (2013.01); *F17C 2205/0394* (2013.01); *F17C 2221/012* (2013.01); *F17C 2223/0123* (2013.01); *F17C 2223/036* (2013.01); *F17C 2225/0123* (2013.01); *F17C 2225/033* (2013.01); *F17C 2225/036* (2013.01); *F17C 2250/032* (2013.01);
(Continued)

(58) Field of Classification Search
None
See application file for complete search history.

(56) References Cited

U.S. PATENT DOCUMENTS

2013/0255808 A1 10/2013 Ninomiya et al.
2016/0116450 A1 4/2016 Saito

FOREIGN PATENT DOCUMENTS

CN 103109069 A 5/2013
CN 105552409 A 5/2016
(Continued)

*Primary Examiner* — Wyatt P McConnel
(74) *Attorney, Agent, or Firm* — Finnegan, Henderson, Farabow, Garrett & Dunner, LLP

(57) ABSTRACT

A fuel gas storage and supply system that supplies fuel gas to a fuel cell includes: a filling port including a first check valve; a decompression valve; a fuel gas pipe; an upstream shut valve disposed between an upstream gas tank and the filling port; a second check valve disposed between the filling port and the upstream shut valve; a pressure sensor disposed between the upstream shut valve and the decompression valve; and a controller configured to control opening and closing of the upstream shut valve using a measured pressure value of the pressure sensor. The controller repeatedly acquires the measured pressure value from the pressure sensor over time when the upstream gas tank is filled with the fuel gas via the filling port and closes the upstream shut valve when an increasing rate of the measured pressure value is less than a predetermined increasing rate threshold value.

6 Claims, 7 Drawing Sheets

(51) Int. Cl.
*H01M 8/0432* (2016.01)
*H01M 8/04746* (2016.01)
*F17C 7/00* (2006.01)
*F17C 13/02* (2006.01)
*H01M 8/04089* (2016.01)
*H01M 8/0438* (2016.01)
*F17C 5/00* (2006.01)

(52) U.S. Cl.
CPC .................. *F17C 2250/043* (2013.01); *F17C 2250/0439* (2013.01); *F17C 2250/0491* (2013.01); *F17C 2265/065* (2013.01); *F17C 2265/066* (2013.01); *F17C 2270/0168* (2013.01); *F17C 2270/0184* (2013.01)

(56) References Cited

FOREIGN PATENT DOCUMENTS

| | | |
|---|---|---|
| JP | 2010-245004 | 10/2010 |
| JP | 2015-148234 | 8/2015 |

FUEL GAS STORAGE AND SUPPLY SYSTEM

INCORPORATION BY REFERENCE

The disclosure of Japanese Patent Application No. 2016-223198 filed on Nov. 16, 2016 including the specification, drawings and abstract is incorporated herein by reference in its entirety.

BACKGROUND

1. Technical Field

The disclosure relates to a fuel gas storage and supply system that supplies fuel gas to a fuel cell.

2. Description of Related Art

Japanese Patent Application Publication No. 2015-148234 (JP 2015-148234 A) discloses a fuel-cell vehicle including a first tank section and a second tank section for fuel gas. The first tank section and the second tank section are connected in series to each other via a first pipe. A filling port which is used to fill the first tank section with fuel gas from the outside is connected to the first tank section via a filling pipe. A high-pressure decompression valve for decompressing fuel gas before the fuel gas is supplied to the fuel cell is connected to the second tank section via a second pipe. When the tank sections are filled with fuel gas, the high-pressure decompression valve is shut and the first tank section and the second tank section are filled with fuel gas from the filling port. When the fuel-cell vehicle travels, the high-pressure decompression valve is activated, and fuel gas flowing from the first tank section to the second pipe via the first pipe and fuel gas flowing from the second tank section to the second pipe are decompressed by the high-pressure decompression valve and are supplied to the fuel cell.

SUMMARY

In general, in order to prevent fuel gas from leaking from the filling port to the outside, a check valve is disposed in the filling port. When the high-pressure decompression valve is out of order and is opened while the tank sections are being filled with fuel gas, there is a likelihood that the first tank section and the second tank section will not be satisfactorily filled with fuel gas and the fuel gas will flow to the fuel cell. On the other hand, when the check valve of the filling port is out of order and is opened while the fuel-cell vehicle is traveling, there is a likelihood that fuel gas will flow back from the first tank section and the second tank section to the filling port and will leak to the outside.

The disclosure can be embodied in the following aspects.

According to an aspect of the disclosure, there is provided a fuel gas storage and supply system. The fuel gas storage and supply system that supplies fuel gas to a fuel cell includes: a filling port that includes a first check valve; a decompression valve that adjusts a pressure of the fuel gas; a fuel gas pipe that connects the filling port to the decompression valve; one or more gas tanks that are connected to the fuel gas pipe; an upstream shut valve that is disposed in the fuel gas pipe between an upstream gas tank closest to the filling port among the one or more gas tanks and the filling port; a second check valve that is disposed in the fuel gas pipe between the filling port and the upstream shut valve; a pressure sensor that is disposed in the fuel gas pipe between the upstream shut valve and the decompression valve; and a controller configured to control opening and closing of the upstream shut valve using a measured pressure value of the pressure sensor, wherein the controller is configured to repeatedly acquire the measured pressure value from the pressure sensor over time when the one or more gas tanks are filled with the fuel gas via the filling port and close the upstream shut valve when an increasing rate of the measured pressure value is less than a predetermined increasing rate threshold value.

According to the fuel gas storage and supply system of this aspect, when the increasing rate of the measured pressure value of the pressure sensor is less than a predetermined increasing rate threshold value at the time of filling the gas tank with fuel gas, there is a high likelihood that the decompression valve is out of order and is opened. At this time, since the controller is configured to close the upstream shut valve, it is possible to prevent fuel gas from flowing into the fuel cell rather than filling the gas tank. Since the second check valve is disposed between the filling port and the upstream shut valve, it is possible to prevent fuel gas from flowing back to the filling port by the second check valve and to prevent fuel gas from leaking to the outside when the gas tank is not being filled with fuel gas and the first check valve of the filling port is out of order and is opened.

In the fuel gas storage and supply system according to the aspect, the controller may be configured to additionally repeatedly acquire the measured pressure value from the pressure sensor over time when the fuel gas is consumed in the fuel cell, and may close the upstream shut valve when a decreasing rate of the measured pressure value is greater than a predetermined decreasing rate threshold value or when the measured pressure value is less than a predetermined pressure threshold value.

According to the fuel gas storage and supply system of this aspect, when the decreasing rate of the measured pressure value of the pressure sensor is greater than a predetermined decreasing rate threshold value or the measured pressure value is less than a predetermined pressure threshold value at the time of consumption of fuel gas in the fuel cell, there is a high likelihood that the first check valve is out of order and is opened. At this time, since the controller is configured to close the upstream shut valve, it is possible to further prevent fuel gas from leaking to the outside.

In the fuel gas storage and supply system according to the aspect, the one or more gas tanks may include a first gas tank corresponding to the upstream gas tank and a second gas tank, each of the first gas tank and the second gas tank may include a cap and a valve module connected to the cap, the valve module may include a sub pipe constituting a part of the fuel gas pipe, a branch pipe branched from the sub pipe and connected to the cap, and a shut valve disposed in the branch pipe, and the upstream shut valve may be disposed in the fuel gas pipe between the valve module of the first gas tank and the filling port.

According to the fuel gas storage and supply system of this aspect, when the gas tank is filled with fuel gas, it is possible to prevent fuel gas from flowing into the fuel cell rather than filling the gas tank. At the time of consumption of fuel gas in the fuel cell, it is possible to prevent fuel gas from leaking to the outside.

In the fuel gas storage and supply system according to the aspect, each of the one or more gas tanks may have a temperature sensor installed in the gas tank, and the controller may be configured to close the upstream shut valve when a measured temperature value of the temperature sensor installed in at least one gas tank among the one or more gas tanks is higher than a predetermined temperature threshold value at the time of filling the one or more gas tanks with the fuel gas via the filling port. According to the fuel gas storage and supply system of this aspect, when the temperature of the gas tank becomes high due to a certain abnormality while the gas tank is filled with fuel gas, the upstream shut valve is closed and thus it is possible to stop filling of the gas tank with fuel gas.

In the fuel gas storage and supply system according to the aspect, the pressure sensor may be connected to the sub pipe in the valve module of the second gas tank, a filter, a check valve, and an ON-OFF valve may be disposed in the sub pipe of the valve module of the first gas tank, and a filter, a check valve, and an ON-OFF valve may be disposed in the sub pipe of the valve module of the second gas tank.

In the fuel gas storage and supply system according to the aspect, the sub pipe of each valve module may be a U-shaped pipe.

The disclosure may be embodied in various forms other than those described above. For example, the disclosure may be embodied in a form such as a fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
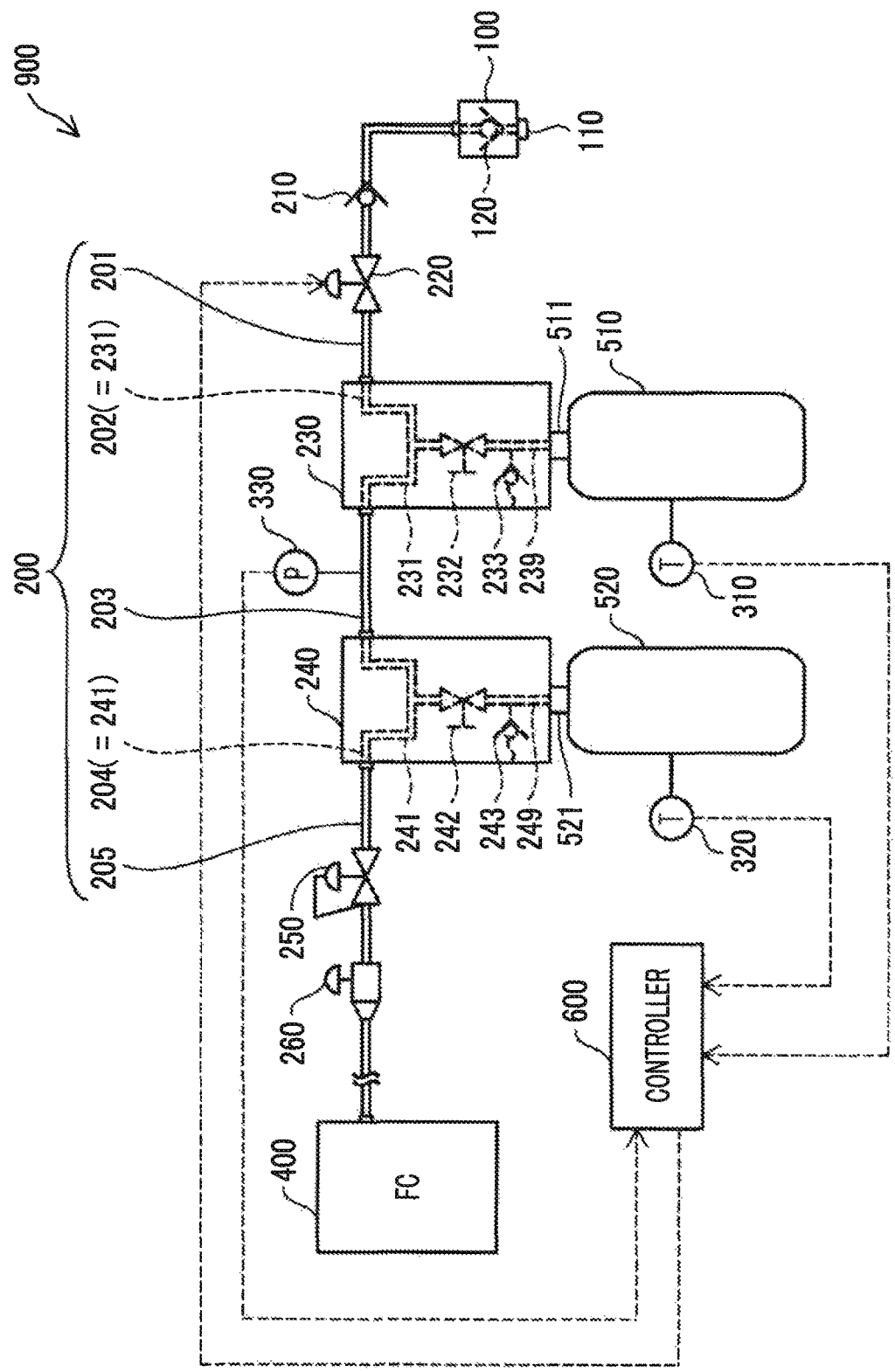
FIG. 1 is a diagram schematically illustrating a fuel gas storage and supply system according to a first embodiment of the disclosure.

FIG. 1 is a diagram schematically illustrating a fuel gas storage and supply system 900 according to a first embodiment of the disclosure. The fuel gas storage and supply system 900 is mounted in, for example, a fuel-cell vehicle and supplies hydrogen (fuel gas) to a fuel cell 400. The fuel gas storage and supply system 900 includes a filling port 100, a fuel gas pipe 200, a first gas tank 510, a second gas tank 520, and a controller 600. The first gas tank 510 corresponds to an upstream gas tank closest to the filling port 100 among the two gas tanks 510, 520.

The filling port 100 is attached to an end of the fuel gas pipe 200 and includes a receptacle 110 and a first check valve 120. The receptacle 110 is an inlet of fuel gas from the outside. The first check valve 120 is a valve for preventing fuel gas in the fuel gas storage and supply system 900 from flowing back to the receptacle 110 and leaking to the outside.

The fuel gas pipe 200 includes sub pipes 201 to 205. In the sub pipe 201, a second check valve 210 and an upstream shut valve 220 are sequentially arranged from the filling port 100. The second check valve 210 is a valve for preventing fuel gas from flowing back to the filling port 100. The upstream shut valve 220 is an electromagnetic ON-OFF valve and switches ON/OFF states in response to a signal supplied from the controller 600.

A first valve module 230 included in the first gas tank 510 is connected between the sub pipe 201 and the sub pipe 203. The first valve module 230 includes a U-shaped pipe 231 and a branch pipe 239. The U-shaped pipe 231 constitutes a part of the fuel gas pipe 200 and corresponds to the sub pipe 202. An end of the branch pipe 239 is connected to the U-shaped pipe 231 and the other end thereof is connected to a cap 511 of the first gas tank 510. A shut valve 232 and a safety valve 233 are disposed in the branch pipe 239.

A second valve module 240 included in the second gas tank 520 is connected between the sub pipe 203 and the sub pipe 205. The second valve module 240 includes a U-shaped pipe 241 and a branch pipe 249, similarly to the first valve module 230. The U-shaped pipe 241 constitutes a part of the fuel gas pipe 200 and corresponds to the sub pipe 204. An end of the branch pipe 249 is connected to the U-shaped pipe 241 and the other end thereof is connected to a cap 521 of the second gas tank 520. A shut valve 242 and a safety valve 243 are disposed in the branch pipe 249.

In the sub pipe 205, a decompression valve 250 and an injector 260 are sequentially arranged from upstream. The decompression valve 250 adjusts high-pressure fuel gas supplied from the gas tanks 510, 520 to low-pressure fuel gas. The injector 260 injects fuel gas to supply the fuel gas to the fuel cell 400.

A pressure sensor 330 is disposed in the sub pipe 203 between the two valve modules 230, 240. The pressure sensor 330 measures a pressure of fuel gas flowing in the sub pipe 203 and supplies a measured pressure value to the controller 600. A first temperature sensor 310 and a second temperature sensor 320 are disposed in the first gas tank 510 and the second gas tank 520, respectively. The temperature sensors 310, 320 measure temperatures of the gas tanks 510, 520 and supply measured temperature values to the controller 600.

The controller 600 is constituted by a microcomputer including a central processing unit and a main storage unit and controls operations of various devices in the fuel gas storage and supply system 900. In FIG. 1, for the purpose of convenience, connection relationships for a control signal or a sensor signal between the controller 600 and the upstream shut valve 220, the temperature sensors 310, 320 and the pressure sensor 330 are indicated by dotted lines. The controller 600 controls opening and closing of the upstream shut valve 220 using the measured temperature values supplied from the temperature sensors 310, 320 and the measured pressure value supplied from the pressure sensor 330.

When the gas tanks 510, 520 are filled with fuel gas, the decompression valve 250 is in a closed state, and the upstream shut valve 220 and the shut valves 232, 242 of the valve modules 230, 240 are in an open state. Fuel gas flows into the sub pipes 201, 202 from the receptacle 110 of the filling port 100 and fills the first gas tank 510 via the branch pipe 239. Some fuel gas flowing into the sub pipe 202 fills the second gas tank 520 via the sub pipes 203, 204 and the branch pipe 249.

On the other hand, when a vehicle having the fuel gas storage and supply system 900 and the fuel cell 400 mounted therein travels, the decompression valve 250, the upstream shut valve 220, and the shut valves 232, 242 of the valve modules 230, 240 are in an open state. The fuel gas stored in the first gas tank 510 flows sequentially via the branch pipe 239, the U-shaped pipe 231, and the sub pipes 203, 204, 205 and is supplied to the fuel cell 400. The fuel gas stored in the second gas tank 520 flows sequentially via the branch pipe 249, the U-shaped pipe 241, and the sub pipe 205 and is supplied to the fuel cell 400. Since the filling port 100 includes the first check valve 120, fuel gas does not flow from the filling port 100 to the outside. Since the second check valve 210 is disposed between the filling port 100 and the upstream shut valve 220, it is possible to prevent fuel gas from flowing back by the second check valve 210 and to prevent fuel gas from leaking to the outside even if the first check valve 120 is out of order.

Figure 2:
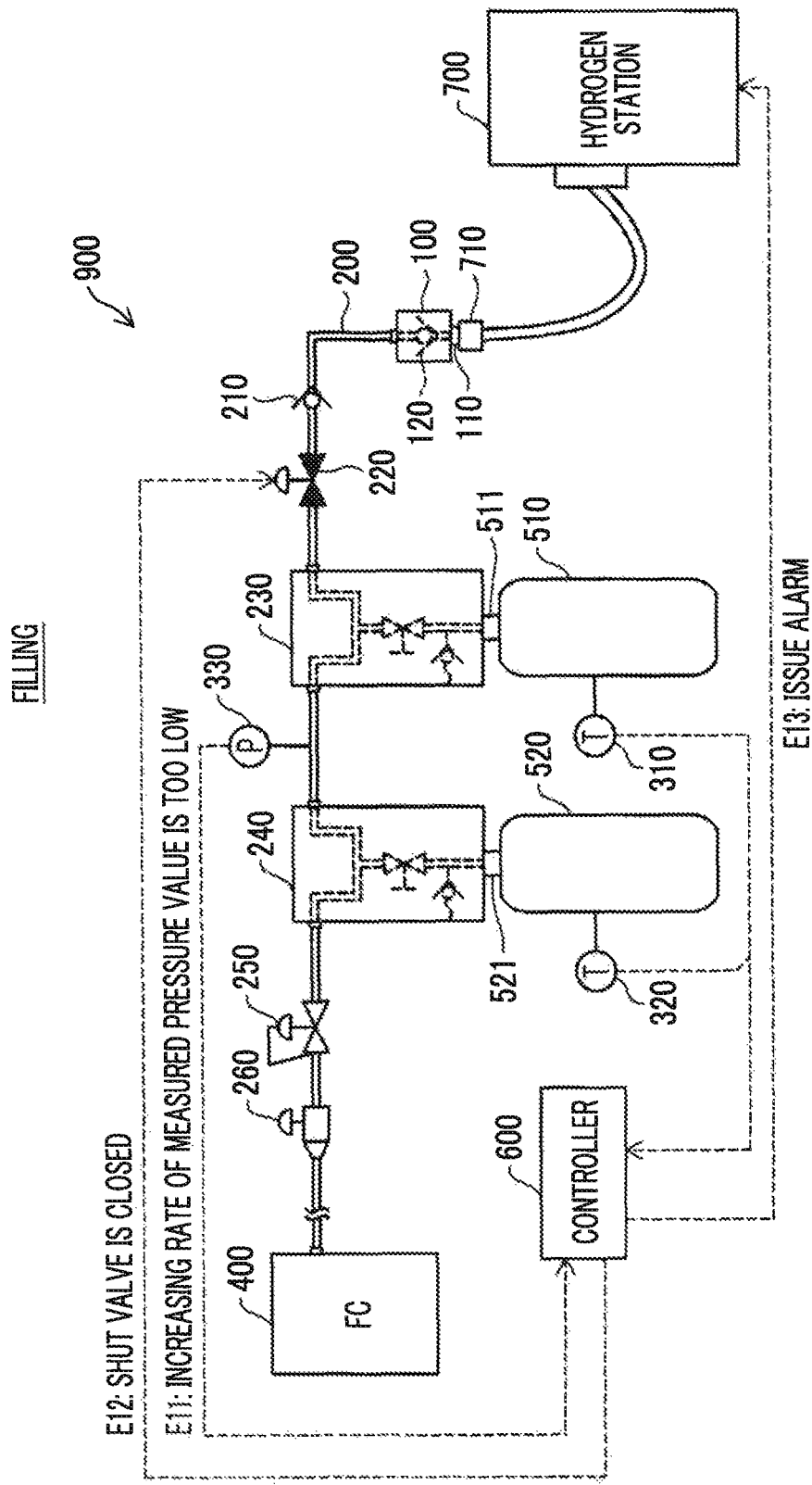
FIG. 2 is a diagram illustrating an operation of the fuel gas storage and supply system during filling with fuel gas.

FIG. 2 is a diagram illustrating the operation of the fuel gas storage and supply system 900 when the decompression valve 250 is out of order and is opened when the gas tanks 510, 520 is being filled with fuel gas. The controller 600 can transmit and receive a signal to and from a hydrogen station 700, for example, using infrared rays. A connection relationship of a control signal between the controller 600 and the hydrogen station 700 is indicated by a dotted line.

Hydrogen (fuel gas) stored in the hydrogen station 700 is supplied to the fuel gas storage and supply system 900 via a nozzle 710 connected to the receptacle 110 of the filling port 100. When the decompression valve 250 operates normally, that is, the decompression valve 250 is closed, during filling with fuel gas, the measured pressure value of the pressure sensor 330 increases normally with filling of the gas tanks 510, 520 with fuel gas. However, when the decompression valve 250 is out of order and is opened, fuel gas does not fill the gas tanks 510, 520 but flows into the fuel cell 400. Accordingly, an increasing rate of the measured pressure value of the pressure sensor 330 is lower than that in a normal case. Here, the controller 600 repeatedly acquires the measured pressure value from the pressure sensor 330 over time and closes the upstream shut valve 220 (Event E11 in FIG. 2) when the increasing rate of the measured pressure value is too low (Event E12 in FIG. 2). Accordingly, even when the decompression valve 250 is out of order and is opened, it is possible to prevent fuel gas from flowing into the fuel cell 400 rather than filling the gas tanks 510, 520. The controller 600 may cause the hydrogen station 700 to issue an alarm (Event E13 in FIG. 2). An operator who fills the gas tanks with fuel gas can stop the filling with hydrogen in response to the alarm.

The controller 600 may close the upstream shut valve 220 when at least one of the first measured temperature value of the first temperature sensor 310 and the second measured temperature value of the second temperature sensor 320 is higher than a predetermined temperature threshold value (for example, an arbitrary temperature value within a range of 80° C. to 90° C.). In this case, when the temperature of the gas tanks 510, 520 increases due to a certain abnormality during filling with fuel gas, it is possible to stop the filling with fuel gas. The temperature sensors 310, 320 may be omitted.

Figure 3:
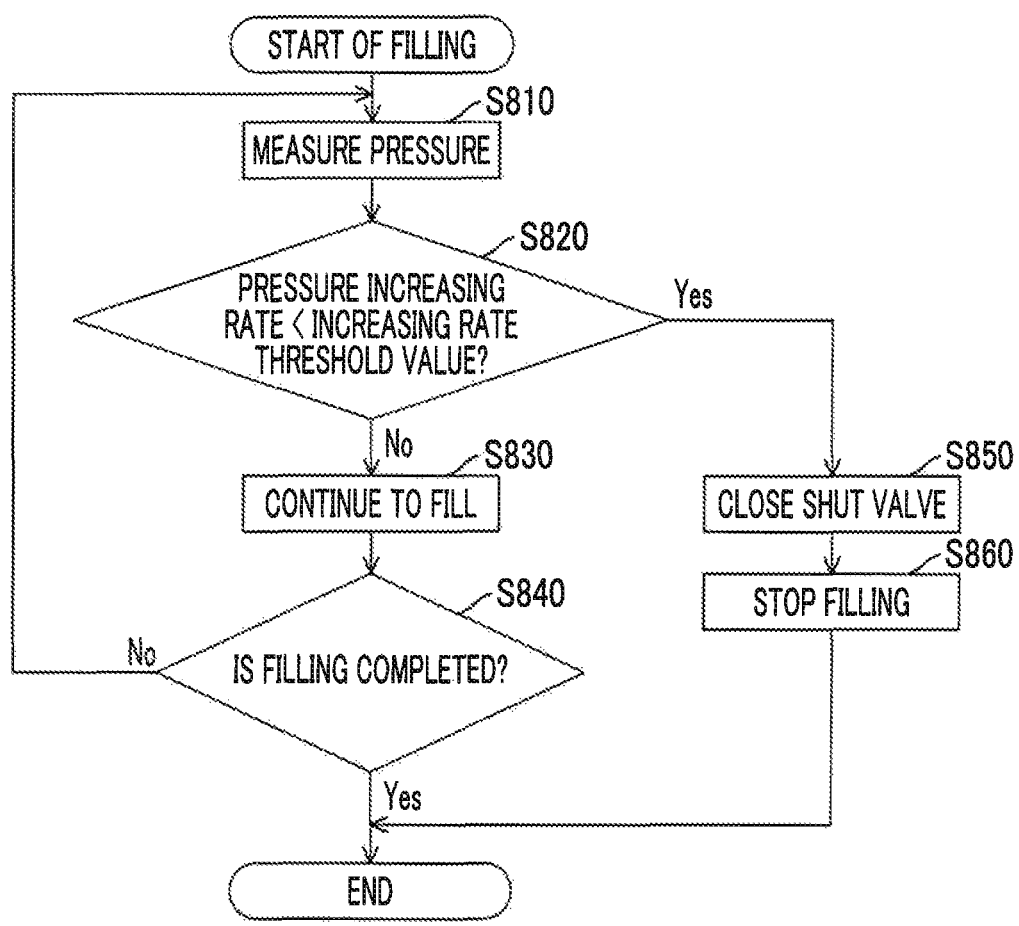
FIG. 3 is a flowchart illustrating a routine during filling with fuel gas.

FIG. 3 is a flowchart illustrating a routine when the gas tanks 510, 520 are filled with fuel gas. After filling is started, in Step S810, the pressure sensor 330 (FIG. 1) measures a pressure of fuel gas flowing in the sub pipe 203 (FIG. 1) of the fuel gas pipe 200 and supplies the measured pressure value to the controller 600 (FIG. 1). In Step S820, the controller 600 determines whether an increasing rate of the measured pressure value is less than a predetermined increasing rate threshold value. Here, the increasing rate threshold value is a minimum value which is stored in the controller 600 in advance and at which a pressure increasing rate of fuel gas is determined to be normal. The increasing rate threshold value may be set to a fixed value or may be set to a value which is determined based on one or more parameters (for example, an amount of fuel gas remaining or an environmental temperature before filling is started) associated with filling with fuel gas.

When it is determined in Step S820 that the increasing rate of the measured pressure value is less than the increasing rate threshold value, the controller 600 closes the upstream shut valve 220 in Step S850. Accordingly, in Step S860, filling with fuel gas is stopped. On the other hand, when it is determined that the increasing rate of the measured pressure value is equal to or greater than the increasing rate threshold value, filling is continuously performed in Step 830. When it is determined in Step S840 that filling is ended, the nozzle 710 (FIG. 2) of the hydrogen station 700 is detached from the receptacle 110 of the filling port 100 and the filling is ended. When it is determined that filling is not ended, the pressure sensor 330 measures a pressure of fuel gas again in Step S810. When it is determined whether the upstream shut valve 220 needs to be closed based on comparison of the measured temperature values of the temperature sensors 310, 320 with a temperature threshold value, this determination is performed in Step S820.

Figure 4:
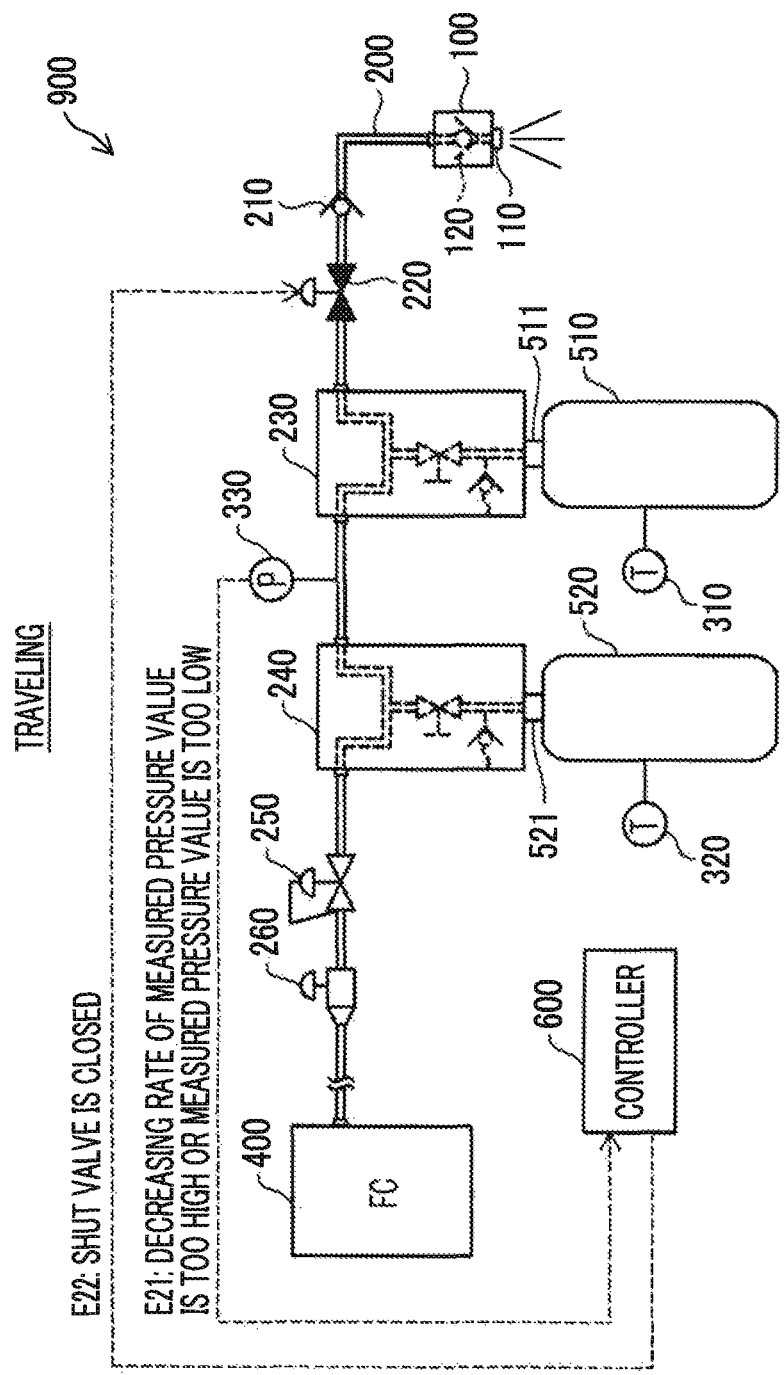
FIG. 4 is a diagram illustrating an operation of the fuel gas storage and supply system during traveling of a vehicle.

FIG. 4 is a diagram illustrating an operation of the fuel gas storage and supply system 900 when the first check valve 120 of the filling port 100 is out of order and is opened during traveling of a vehicle having the fuel gas storage and supply system 900 and the fuel cell 400 mounted therein. When the first check valve 120 of the filling port 100 is out of order and is opened during traveling of the vehicle, fuel gas can be prevented from flowing back to the filling port 100 by the second check valve 210 because the second check valve 210 is disposed between the filling port 100 and the upstream shut valve 220 and thus it is possible to prevent leaking of fuel gas. In order to further prevent leaking of fuel gas, the following control may be performed.

In FIG. 4, with consumption of fuel gas supplied from the gas tanks 510, 520 in the fuel cell 400, the measured pressure value of the pressure sensor 330 decreases normally during traveling of the vehicle. However, when the first check valve 120 of the filling port 100 is out of order and is opened, there is a likelihood that some fuel gas supplied from the gas tanks 510, 520 will leak from the receptacle 110 of the filling port 100 to the outside. At this time, when the second check valve 210 is completely closed, leaking of fuel gas to the outside does not occur, but there is a likelihood that the second check valve 210 will not be completely closed. In this case, a decreasing rate of the measured pressure value of the pressure sensor 330 is higher than that in a normal case, and the measured pressure value is lower than that in a normal case due to leakage of fuel gas. Here, the controller 600 repeatedly acquires the measured pressure value from the pressure sensor 330 over time, and closes the upstream shut valve 220 (Event E22 in FIG. 4) when the decreasing rate of the measured pressure value is too high or the measured pressure value is too small (Event E21 in FIG. 4). Accordingly, it is possible to prevent fuel gas from flowing back to the filling port 100 and leaking to the outside. The tis controller 600 may issue an alarm to a driver of the vehicle.

Figure 5:
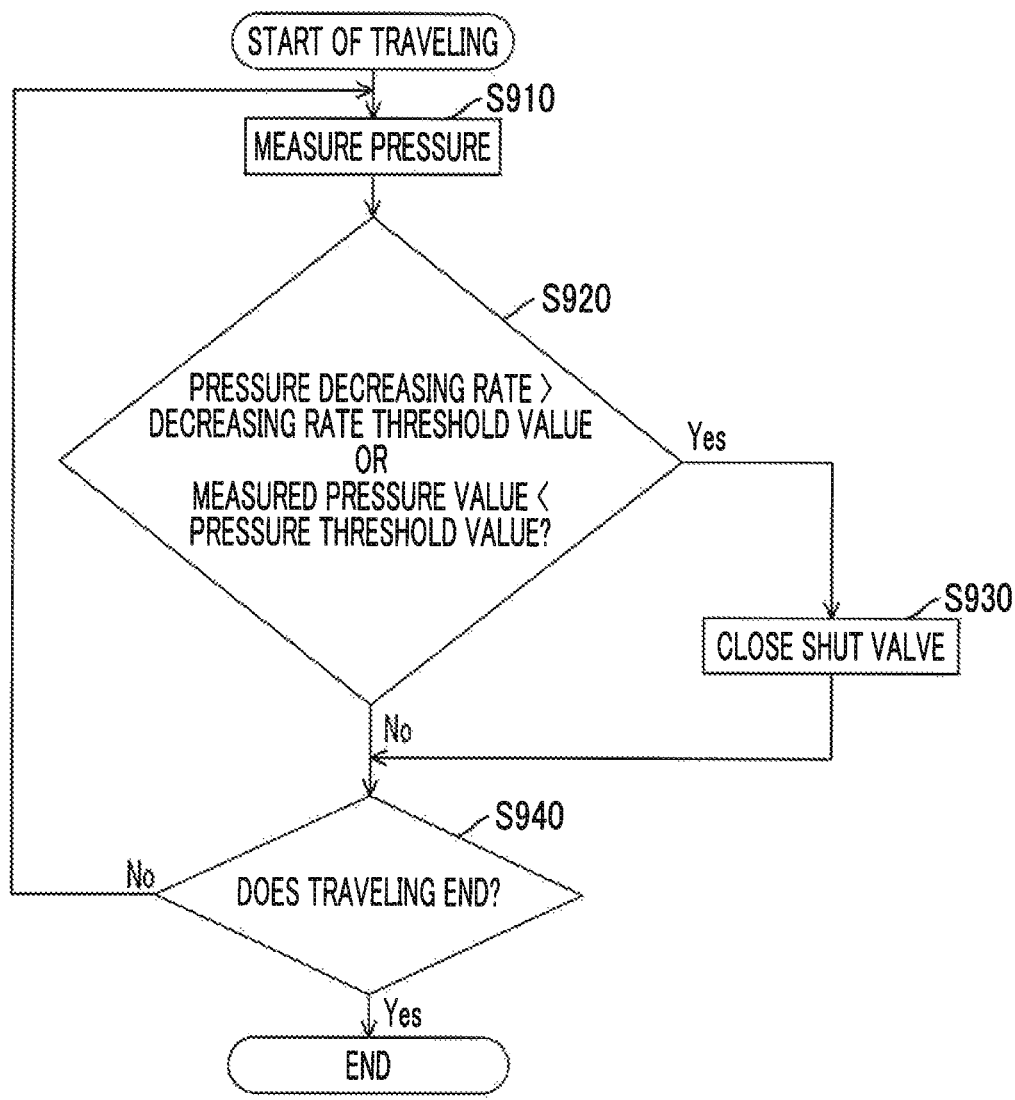
FIG. 5 is a flowchart illustrating a routine during traveling of a vehicle.

FIG. 5 is a flowchart illustrating a routine during traveling of a vehicle having the fuel gas storage and supply system 900 and the fuel cell 400 mounted therein. After traveling is started, in Step S910, the pressure sensor 330 (FIG. 1) measures a pressure of fuel gas flowing in the sub pipe 203 (FIG. 1) of the fuel gas pipe 200 and supplies the measured pressure value to the controller 600 (FIG. 1). In Step S920, the controller 600 determines whether the decreasing rate of the measured pressure value is greater than a predetermined decreasing rate threshold value or whether the measured pressure value is less than a predetermined pressure threshold value. Here, the decreasing rate threshold value is a maximum value which is stored in the controller 600 in advance and at which the decreasing rate of the measured pressure value of fuel gas is determined to he normal. The pressure threshold value is a minimum pressure of fuel gas which is stored in the controller 600 in advance and at which a normal operation of the fuel cell 400 (FIG. 1) is maintained. The decreasing rate threshold value may be set to a fixed value or may be set to a value which is determined based on one or more parameters (for example, an amount of fuel gas supplied to the fuel cell 400 or an environmental temperature) associated with filling with fuel gas. The pressure threshold value is the same.

When it is determined in Step S920 that the decreasing rate of the measured pressure value is greater than the decreasing rate threshold value or when it is determined that the measured pressure value is less than the pressure threshold value, the controller 600 closes the upstream shut valve 220 in Step S930 and then performs Step S940. On the other hand, when it is determined that the decreasing rate of the measured pressure value is equal to or less than the decreasing rate threshold value and the measured pressure value is equal to or greater than the pressure threshold value, Step S940 is performed. When it is determined in Step S940 that traveling is ended, the vehicle stops. performed. When traveling is not ended, the pressure sensor 330 measures a pressure of fuel gas again in Step S910. This control of closing the upstream shut valve 220 depending on the measured pressure value during traveling of the vehicle may be omitted.

As described above, in the first embodiment, when it is determined that the increasing rate of the measured pressure value of the pressure sensor 330 is less than the predetermined increasing rate threshold value during filling with fuel gas, the controller 600 closes the upstream shut valve 220 and thus it is possible to prevent fuel gas from flowing into the fuel cell 400 rather than filling the gas tanks 510, 520. Since the second check valve 210 is disposed between the filling port 100 and the upstream shut valve 220, it is possible to prevent fuel gas from flowing back to the filling port 100 by the second check valve 210 and to prevent fuel gas from leaking to the outside when the first check valve 120 of the filling port 100 is out of order and is opened during traveling of the vehicle.

The second gas tank 520 closer to the decompression valve 250 among the gas tanks 510, 520 and the second valve module 240 may be omitted. On the other hand, three or more gas tanks may be provided. In other words, the fuel gas storage and supply system 900 is configured to include one or more gas tanks. In this case, the upstream shut valve 220 is disposed in the fuel gas pipe 200 (the sub pipe 201) between the filling port 100 and the upstream gas tank (the first gas tank 510) closest to the filling port 100, The pressure sensor 330 is disposed in the fuel gas pipe 200 (one of the sub pipes 201 to 205) between the upstream shut valve 220 and the decompression valve 250.

Second Embodiment

Figure 6:
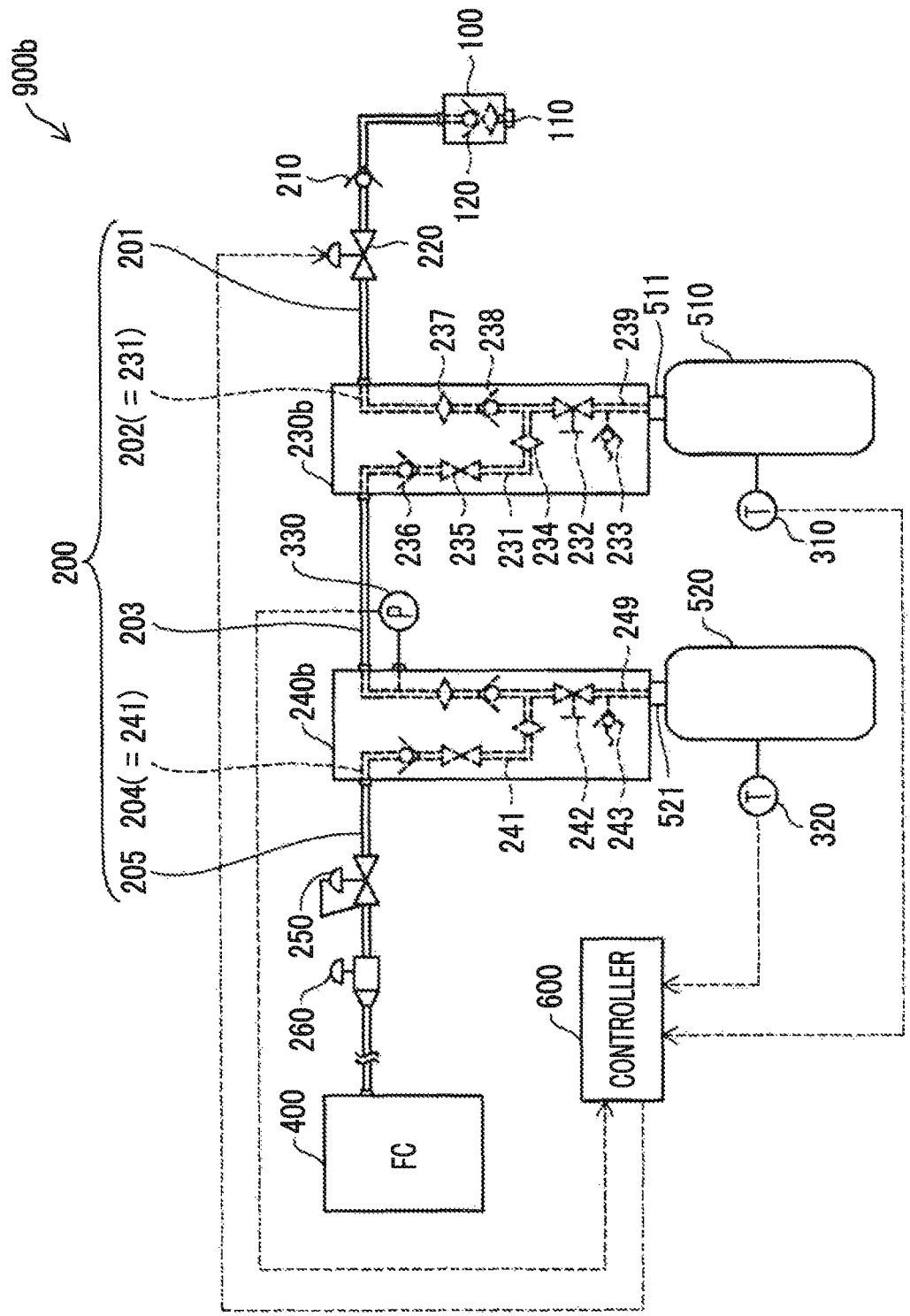
FIG. 6 is a diagram schematically illustrating a fuel gas storage and supply system according to a second embodiment.

FIG. 6 is a diagram schematically illustrating a fuel gas storage and supply system 900b according to a second embodiment and corresponds to FIG. 1. The second embodiment is the same as the first embodiment illustrated in FIG. 1, except for an installation position of a pressure sensor 330 and configurations of valve modules 230b, 240b. In FIG. 6, the pressure sensor 330 is connected to the U-shaped pipe 241 in the valve module 240b of the second gas tank 520. Filters 234, 237, check valves 236, 238, and ON-OFF valves 235 are disposed in the U-shaped pipe 231 in the valve module 230b of the first gas tank 510. The valve module 240b has the same configuration. When the filters 234, 237 are provided, it is possible to remove foreign materials in fuel gas filled from the outside. When the check valves 236, 238 are provided, it is possible to more satisfactorily prevent fuel gas from flowing back to the filling port 100.

In FIG. 6, the operation (not illustrated) when the decompression valve 250 is out of order and is opened during filling with fuel gas is the same as Events E11, E12 in the first embodiment illustrated in FIG. 2. The operation (not illustrated) when the first check valve 120 of the filling port 100 is out of order and is opened during traveling of the vehicle is the same as Events E21, E22 in the first embodiment illustrated in FIG. 4. The second embodiment has substantially the same advantages as the first embodiment.

Third Embodiment

Figure 7:
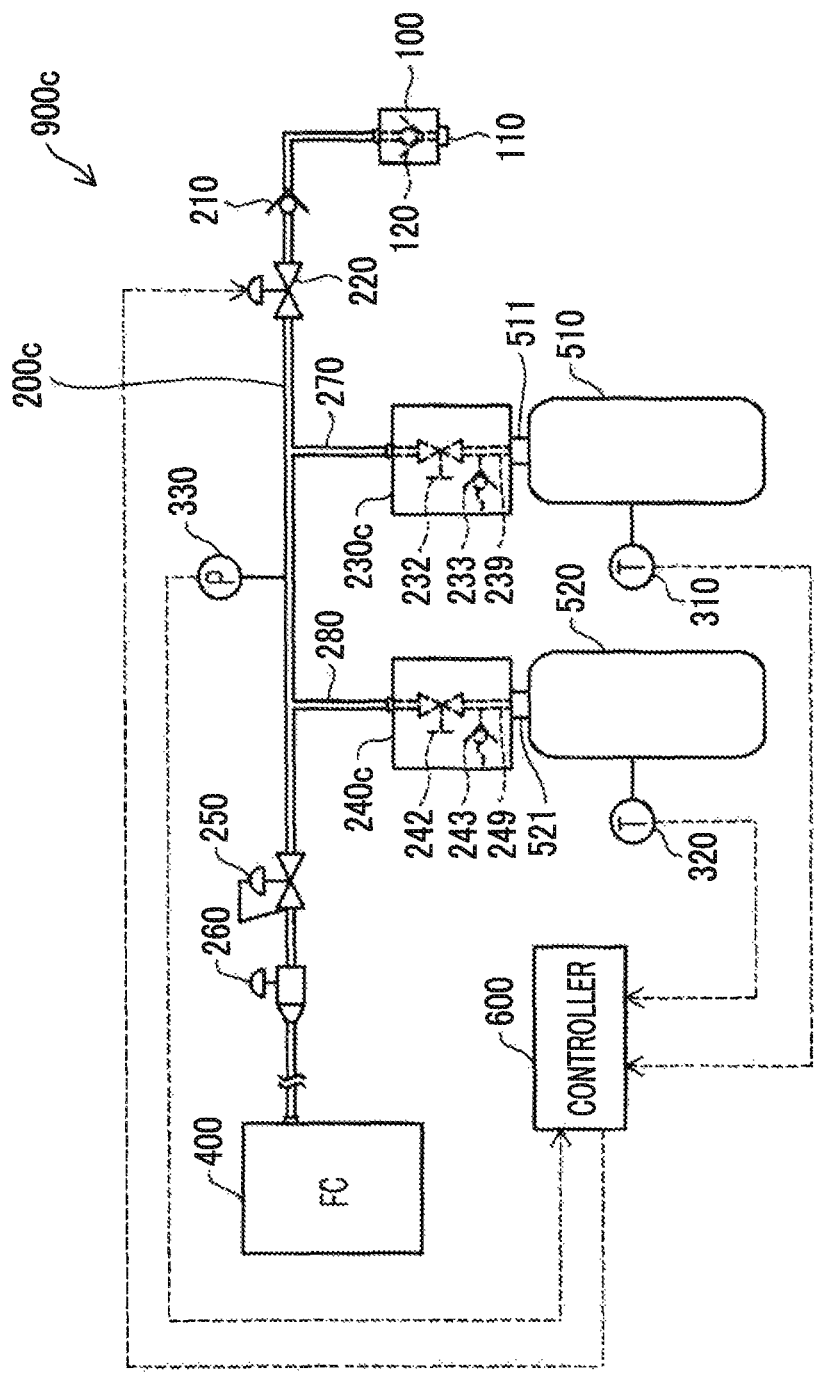
FIG. 7 is a diagram schematically illustrating a fuel gas storage and supply system according to a third embodiment.

FIG. 7 is a diagram schematically illustrating a fuel gas storage and supply system 900c according to a third embodiment and corresponds to FIG. 1. The third embodiment is the same as the first embodiment illustrated in FIG. 1, except for a configuration of a fuel gas pipe 200e and configurations of valve modules 230c, 240c. The fuel gas pipe 200c connects the filling port 100 and the decompression valve 250 and branch flow channels 270, 280 are disposed in the middle thereof. The valve modules 230c, 240c do not include a U-shaped pipe. The pipe 239 of the first valve module 230c is connected to the first branch flow channel 270, and the pipe 249 of the second valve module 240c is connected to the second branch flow channel 280. In FIG. 7, the upstream shut valve 220 is disposed in the fuel gas pipe 200c between a branch point of the first branch flow channel 270 and the filling port 100. Then, when the first check valve 120 of the filling port 100 is out of order and is opened during traveling, it is possible to prevent fuel gas from flowing back from both the first gas tank 510 and the second gas tank 520 and to prevent fuel gas from leaking to the outside.

In FIG. 7, the operation (not illustrated) when the decompression valve 250 is out of order and is opened during filling with fuel gas is the same as Events E11, E12 in the first embodiment illustrated in FIG. 2. The operation (not illustrated) when the first check valve 120 of the filling port 100 is out of order and is opened during traveling of the vehicle is the same as Events Events E21, E22 in the first embodiment illustrated in FIG. 4. The third embodiment has substantially the same advantages as the first embodiment.

Modified Example

The disclosure is not limited to the above-mentioned embodiment, but can be modified in various forms without departing from the gist thereof. For example, the following modification is conceivable.

Modified Example 1

In the above-mentioned embodiment, the fuel gas storage and supply system 900 is used for an on-board fuel cell 400, but the disclosure may be applied to a fuel gas storage and supply system for a stationary type fuel cell.

The disclosure is not limited to the above-mentioned embodiments and the modified example, but can be embodied in various forms without departing from the gist thereof. For example, the technical features of the embodiments corresponding to the technical features of the aspects described in the SUMMARY or the modified example can be appropriately replaced or combined to achieve some or all of the above-mentioned advantages. The technical features can be appropriately deleted unless the technical features are described as being essential in the specification.

What is claimed is:

1. A fuel gas storage and supply system that supplies fuel gas to a fuel cell, comprising:
    a filling port that includes a first check valve;
    a decompression valve that adjusts a pressure of the fuel gas;
    a fuel gas pipe that connects the filling port to the decompression valve;
    one or more gas tanks that are connected to the fuel gas pipe;
    an upstream shut valve that is disposed in the fuel gas pipe between an upstream gas tank closest to the filling port among the one or more gas tanks and the filling port;
    a second check valve that is disposed in the fuel gas pipe between the filling port and the upstream shut valve;
    a pressure sensor that is disposed in the fuel gas pipe between the upstream shut valve and the decompression valve; and
    a controller configured to control opening and closing of the upstream shut valve using a measured pressure value of the pressure sensor,
    wherein the controller is configured to repeatedly acquire the measured pressure value from the pressure sensor over time when the one or more gas tanks are filled with the fuel gas via the filling port and close the upstream shut valve when an increasing rate of the measured pressure value is less than a predetermined increasing rate threshold value.

2. The fuel gas storage and supply system according to claim 1, wherein the controller is configured to additionally repeatedly acquire the measured pressure value from the pressure sensor over time when the fuel gas is consumed in the fuel cell, and close the upstream shut valve when a decreasing rate of the measured pressure value is greater than a predetermined decreasing rate threshold value or when the measured pressure value is less than a predetermined pressure threshold value.

3. The fuel gas storage and supply system according to claim 1, wherein the one or more gas tanks include a first gas tank corresponding to the upstream gas tank and a second gas tank,
    each of the first gas tank and the second gas tank includes a cap and a valve module connected to the cap,
    the valve module includes a sub pipe constituting a part of the fuel gas pipe, a branch pipe branched from the sub pipe and connected to the cap, and a shut valve disposed in the branch pipe, and
    the upstream shut valve is disposed in the fuel gas pipe between the valve module of the first gas tank and the filling port.

4. The fuel gas storage and supply system according to claim 1, wherein each of the one or more gas tanks has a temperature sensor installed in the gas tank, and
    the controller is configured to close the upstream shut valve when a measured temperature value of the temperature sensor installed in at least one gas tank among the one or more gas tanks is higher than a predetermined temperature threshold value at the time of filling the one or more gas tanks with the fuel gas via the filling port.

5. The fuel gas storage and supply system according to claim 3, wherein the pressure sensor is connected to the sub pipe in the valve module of the second gas tank,
    a filter, a check valve, and an ON-OFF valve are disposed in the sub pipe of the valve module of the first gas tank, and
    a filter, a check valve, and an ON-OFF valve are disposed in the sub pipe of the valve module of the second gas tank.

6. The fuel gas storage and supply system according to claim 3, wherein the sub pipe of each valve module is a U-shaped pipe.

* * * * *